United States Patent [19]

Kawabe et al.

[11] Patent Number: 4,939,059
[45] Date of Patent: Jul. 3, 1990

[54] ELECTROPHOTOGRAPHIC DEVELOPER FOR FIXING ROLLER PROCESS USING POLYESTER RESIN

[75] Inventors: Kuniyasu Kawabe; Masayoshi Nawa; Norihiro Hayashi, all of Wakayama, Japan

[73] Assignee: Kao Corporation, Tokyo, Japan

[21] Appl. No.: 89,437

[22] Filed: Aug. 26, 1987

[30] Foreign Application Priority Data

Sep. 10, 1986 [JP] Japan .................. 61-213511

[51] Int. Cl.$^5$ ............................................. G03G 13/20
[52] U.S. Cl. ....................................... 430/99; 525/934; 430/109; 430/904; 528/296
[58] Field of Search ................ 430/111, 109, 904, 99; 528/296

[56] References Cited

U.S. PATENT DOCUMENTS

| | | | |
|---|---|---|---|
| 3,590,000 | 6/1971 | Palermiti et al. | 430/110 |
| 3,591,503 | 7/1971 | Hagenbach et al. | 430/108 |
| 3,681,106 | 8/1972 | Burns et al. | 430/109 |
| 4,137,188 | 1/1979 | Uetake et al. | 430/111 |
| 4,401,741 | 8/1983 | Miyakawa | 430/903 X |
| 4,657,837 | 4/1987 | Morita et al. | 430/914 X |

FOREIGN PATENT DOCUMENTS

| | | | |
|---|---|---|---|
| 238849 | 11/1985 | Japan | 430/109 |
| 0247246 | 12/1985 | Japan | 430/109 |
| 1120156 | 6/1986 | Japan | 430/109 |
| 1153663 | 7/1986 | Japan | 430/109 |

Primary Examiner—J. David Welsh
Attorney, Agent, or Firm—Birch, Stewart, Kolasch & Birch

[57] ABSTRACT

An electrophotographic developer composition comprises a binder resin, which comprises a polyester as the major component, said polyester obtained by co-condensation polymerization of (i) a diol component represented by the general formula:

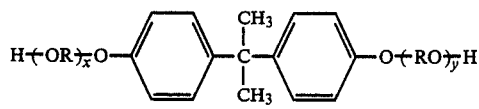

wherein R is an ethylene or propylene group and x and y are each an integer of 1 or more, with the proviso that the average sum total of x and y is 2 to 7, with (ii) a dicarboxylic acid, an anhydride or a lower alkyl ester thereof and (iii) a polycarboxylic acid having at least three carboxyl groups or an anhydride or a lower alkyl ester thereof or a polyhydric alcohol having at least three hydroxyl groups and having an OHV/AV value of at least 1.2 wherein AV is an acid value of the polyester and OHV is a hydroxyl value thereof, and at least two charge controllers.

8 Claims, No Drawings

ELECTROPHOTOGRAPHIC DEVELOPER FOR FIXING ROLLER PROCESS USING POLYESTER RESIN

BACKGROUND OF THE INVENTION

1. Field of the Invention

The present invention relates to a developer composition suitable for developing an electrostatically charged image in electrophotography, electrostatic recording, electrostatic printing and the like.

2. Discussion of Related Art

As described in U.S. Pat. Nos. 2297691 and 2357809, the electrophotography of the prior art comprises electrically charging a photoconductive insulating layer uniformly, partially discharging the layer by exposure to light to form an electrically charged latent image, making an electrically charged color fine powder (a so-called toner) adhere to the latent image (developing step), transferring the obtained visible image to a transfer material such as transfer paper (transfer step) and permanently fixing the transferred image by a suitable fixing method such as heating and pressing.

Accordingly, a toner must satisfy the functions required not only in the developing step but also in the transfer and fixing steps.

Generally, a toner undergoes mechanical friction caused by shear and shock, while it behaves mechanically in a developing device. Therefore, it is deteriorated by repeating duplication several thousands to several tens of thousands times. Such deterioration of a toner can be inhibited by the use of a resin having a high molecular weight which is tough enough to stand the mechanical friction. However, since such a resin generally has a high softening point, a toner containing such a resin can not be fixed sufficiently firmly by a non-contact fixing method of a low thermal efficiency, such as oven fixing or radiant fixing using infrared rays. Even when such a toner is fixed by a heat roller fixing method which is a contact method excellent in thermal efficiency, the roller must be heated to a considerably high temperature in order to attain sufficiently firm fixing and the fixing at such a high temperature causes deterioration of a fixing device, curling of paper, increase in energy consumption and the like. Further, the production efficiency of a toner containing such a high-molecular weight resin is remarkably low, because such a resin is not readily pulverized. Thus, it is unsuitable to use a resin having a high degree of polymerization and a high softening point as a binder of a toner. On the other hand, the heat roller fixing method involves contacting the surface of a heated roller with the surface of a toner image, so that it is remarkably excellent in thermal efficiency to be widely employed not only in high-speed fixing but also in low-speed fixing. However, the heat roller fixing method is disadvantageous in that the toner constituting a transferred image tends to adhere to a heated roller, when the surface of the toner image is contacted with the roller, and that the toner thus adhering to the heated roller tends to be retransferred to the succeeding transfer paper. That is, the heat roller fixing method tends to cause a so-called offset phenomenon. In order to inhibit this phenomenon, the surface of the roller is processed with a material excellent in release properties, such as a fluorinated resin, and further coated with a release agent such as a silicone oil.

However, this method of applying silicone oil requires an enlarged fixing device to therefore bring about not only an increase in cost but also complicatedness, thus being unfavorable.

A process for the inhibition of offset phenomenon which comprises using a resin having a wide molecular weight distribution as a binder resin is known as described in Japanese Patent Publication No. 6895/1980 and Japanese Patent Laid-Open No. 98202/1981. However, such a resin generally has a high degree of polymerization and therefore requires a high fixing temperature.

Further, a process which comprises unsymmetrizing or crosslinking a binder resin to inhibit offset has been reported as a more effective process in, for example, Japanese Patent Publication No. 493/1982 and Japanese Patent Laid-Open Nos. 44836/1975 and 37353/1982. However, this process does not improve the fixability.

Since the lowest fixing temperature is generally between a low-temperature offset disappearing temperature and a high-temperature offset initiating temperature, the operating temperature range is between the minimum fixing temperature and the high temperature offset-initiating temperature. Therefore, the practical fixing temperature can be lowered with an enlargement of the operable temperature range by lowering the lowest fixing temperature as low as possible and enhancing the high-temperature offset initiating temperature as high as possible to thereby attain energy reduction, high-speed fixing and inhibition of paper curling. Further, lowering to the lowest fixing temperature and enhancement of the high-temperature offset initiating temperature allow copying on both sides without causing any trouble to bring about various advantages such as rendering a duplicating machine intelligent and relaxation of accuracy and tolerance of temperature control of a fixing device.

Thus, development of a resin excellent in fixability and offset resistance and a toner containing such a resin has long been expected.

It is known as described in Japanese Patent Laid-Open Nos. 65232/1974, 28840/1975 and 81342/1975 that the offset resistance of a toner containing a styrene resin as a binder can be enhanced by adding thereto paraffin wax, a low-molecular weight polyolefin or the like. However, it has also been confirmed that the addition thereof in too small an amount does not exhibit any effect, while the addition thereof in too large an amount accelerates the deterioration of the developer.

As described in U.S. Pat. No. 3,590,000, a polyester resin is essentially so excellent in fixability that it can be sufficiently firmly fixed even by a non-contact fixing method. However, it is difficult to apply a heat roller fixing method to a polyester resin, because offset phenomenon frequently occurs. Japanese Patent Laid-Open Nos. 44836/1975, 37353/1982 and 109875/1982 disclose polyester resins which are prepared by using a polycarboxylic acid to thereby improve their offset resistance. However, some of these polyester resins do not exhibit sufficient offset resistance, while most of the others sacrifice their low-temperature fixability inherent in polyester, though they exhibit improved offset resistance, thus most of them being problematic. A toner containing a polyester resin tends to exhibit poorer fluidity than that of a toner containing a styrene resin. That is, the former tends to agglomerate to exhibit poor transportability in a developing device, so that its developability is lowered to give a low-quality visible image having unevenness, stain in non-image areas or the like.

For the purpose of improving the fluidity of a toner, a large amount of a fluidity improver such as hydrophobic silica powder is generally added. As a result of the addition thereof, however, when the surface of a latent image-supporting body is cleaned with a blade made of urethane rubber or the like, the toner particles get in between the blade and the support to result in incomplete cleaning, thus staining the visible image. Further, when an image-forming device of recycle type wherein a toner which has been developed, but has not been transferred is recycled to a developing device and re-used is employed, the hydrophobic silica fine powder is buried in the surface of the toner particle, so that the fluidity of the resulting toner lowers to give a low-quality visible image.

Further, a polyester itself has a proper frictional chargeability, so that a toner containing a polyester resin can be charged even without the addition of any charge controller. However, since the whole of a polyester resin is charged, the frictional charge of a toner containing a polyester resin gradually increases, while duplication is repeated. For example, after repeating duplication fifty thousand times or more, such a toner gives a visible image which is adversely affected by change in charge of the toner such as one having a reduced density.

The present invention has been made to solve the above mentioned problems and an object of the invention is to provide a developer which can be fixed according to the heat roller fixing method without causing offset even when no offset inhibitor is applied and is fixable at a low temperature.

Another object of the present invention is to provide a developer which exhibits an excellent fluidity and a prolonged life (slow deterioration) and does not cause blocking.

SUMMARY OF THE INVENTION

The present invention relates to an electrophotographic developer composition containing a binder resin, which comprises a polyester as the major component, said polyester obtained by co-condensation polymerization of (i) a diol component represented by the general formula:

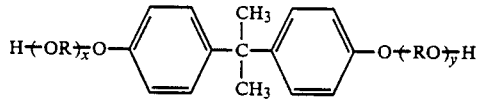

wherein R is an ethylene or propylene group and x and y are each an integer of 1 or more, with the proviso that the average
sum total of x and y is 2 to 7, with
(ii) a dicarboxylic acid or anhydride or a lower alkyl ester thereof and
(iii) a polycarboxylic acid having at least three carboxyl groups or an anhydride or a lower alkyl ester thereof or a polyhydric alcohol having at least three hydroxyl groups and having an OHV/AV value of at least 1.2 wherein AV is an acid value of the polyester and OHV is a hydroxyl value thereof, and at least two charge controllers.

According to the present invention, it is preferred that the binder resin has a softening point of to 160° C. and a glass transition temperature of 50° to 80° C. Further, the charge controllers to be used preferably comprise at least one charge controller which is positively chargeable and at least which is negatively chargeable one. Furthermore, it is preferable that the amount of the positively chargeable charge controller used does not exceed one-half of that of the negatively chargeable charge controller used.

The polyester resin has residual carboxyl groups or hydroxyl groups at the terminal ends of the molecules unless it undergoes the ester interchange reaction or the reaction with a monobasic carbylic acid or a monohydric alcohol during production. It is known that an amount of tribo electric charge on the polyester resin changes according to the number of the terminal groups. If the number of terminal groups is excessively low, especially if the acid value is excessively low, the amount of tribo electric charge on the polyester resin is low. If too many terminal groups as such exist, the acid value is too high, an amount of tribo electric charge on the polyester increases up to a certain level. But it is not suitable for a toner because a resulting toner is easily affected by the environmental conditions, in particular humidity. Polyesters having an acid value of 5 to 60 (KOH) mg/g) are commonly used for toners. Now, it has been found that a toner containing a polyester resin having an OHV/AV value of at least 1.2 wherein AV is an acid value of the polyester resin and OHV is a hydroxyl value thereof is excellent in fluidity and the use thereof can lower the lowest fixing temperature.

The polyester resin to be used as a major component of a binder resin according to the present invention can be prepared by the condensation polymerization between an alcoholic component and a carboxylic component (such as carboxylic acid or ester or anhydride thereof). Examples of the diol component (i) which is one of the members constituting the alcoholic component include polyoxypropylene (2.2)-2,2-bis(4-hydroxyphenyl)propane, polyoxypropylene(3.3)-2,2-bis(4-hydroxyphenyl)propane, polyoxyethylene(2.0)-2,2-bis(4-hydroxyphenyl)propane, polyoxypropylene(2.0)-polyoxyethylene(2.0)-2,2-bis(4-hydroxyphenyl)propane, polyoxypropylene(6)-2,2-bis(4-hydroxyphenyl)propane and the like.

The above alcoholic component may, if necessary, contain other alcohols selected from among diols such as ethylene glycol, diethylene glycol, triethylene 1,4-butanediol, neopentyl glycol, 1,4-butenediol, 1,5-pentanediol, 1,6-hexanediol, 1,4-cyclohexaneglycol, dimethanol, dipropylene glycol, polyethylene glycol, polypropylene glycol and polytetramethylene glycol and other dihydric alcohols such as bisphenol A and hydrogenated bisphenol A in an amount not exceeding 10 molar % based on the whole alcoholic component.

The dicarboxylic acid component (ii) includes maleic acid, fumaric acid, citraconic acid, itaconic acid, glutaconic acid, phthalic acid, isophthalic acid, terephthalic acid, cyclohexanedicarboxylic acid, succinic acid, adipic acid, sebacic acid, azelaic acid, malonic acid, an alkenyl-succinic acid, an alkyl-succinic acid such as n-dodecenylsuccinic acid and n-dodecylsuccinic acid, an anhydride thereof and a lower alkyl ester thereof.

According to the present invention, the polyfunctional monomer (iii) having at least three functional groups serves to inhibit offset phenomenon. If the amount of the polyfunctional monomer is too small, little effect will be attained. On the contrary, if the amount is too large, the control of the reaction will be so difficult that a polyester resin having a consistent performance will be difficultly obtained and the obtained resin will be too hard to be easily pulverized, so that unfavorable phenomena such as remarkable reduction in production efficiency of a toner or increase in the lowest fixing temperature will occur. Accordingly, the amount of the polyfunctional monomer (iii) used is preferably 5 to 60 molar based on the carboxylic or alcoholic component. Examples of the polyhydric alcohol having at least three hydroxyl groups to be used as a polyfunctional monomer (iii) include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl1,2,4-butanetriol, trimethylolethane, trimethylolpropane, 1,3,5-trihydroxymethylbenzene and other polyhydric alcohols having at least three hydroxyl groups, while those of the polycarboxylic acid having at least three carboxyl groups to be used as a polyfunctional monomer (iii) include 1,2,4-benezenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxy)methane, 1,2,7,8-octanetetracarboxylic acid, pyromellitic acid, Empol trimer acid, anhydrides and lower alkyl esters thereof and other carboxylic acid having at least three carboxyl groups.

According to the present invention, it is preferred that the binder resin containing the above polyester resin as a major component has a softening point of 106° to 160° C. and a glass transition temperature of 50° to 80° C. If the softening point is lower than 106° C., no sufficiently wide non-offset temperature range will be attained, while if it exceeds 160° C., unfavorable phenomena such as rise in the lowest fixing temperature will occur. On the other hand, if the glass transition temperature is lower than 50° C., a toner containing such a binder will exhibit a poor storage stability, while if it exceeds 80° C., the fixability will be adversely affected, which is unfavorable.

The acid value and hydroxyl value of a polyester resin can be determined according to JIS K 0070. Particularly, when the content of ethyl acetate insolubles exceeds 3% by weight, it is preferred to use dioxane as a solvent for the determination of the acid value.

According to the present invention, a polyester resin having an OHV/AV value of at least 1.2 wherein AV is an acid value of the resin and OHV is a hydroxyl value thereof is used as a major component of a binder resin. If a polyester resin having an OHV/AV value of less than 1.2 is used, the obtained toner will exhibit a lowest fixing temperature higher than that of the toner containing a polyester resin having an OHV/AV value of not less than 1.2 and will be so poor in fluidity that a large amount of a fluidity improver such as hydrophobic silica powder will have to be added to enhance the fluidity sufficiently. Such addition will tend to give a low-quality visible image as described above.

The polyester having an OHV/AV value of at least 1.2 can be easily prepared by condensation polymerization in which a total amount of the alcohol components is more than that of the carboxylic acid components in terms of the number of the functional groups.

The developer composition of the present invention essentially contains the above polyester resin and at least two charge controllers preferably comprising at least one positively chargeable charge controller and at least one negatively chargeable charge controller each in such an amount that the amount of the former does not exceed one-half of the amount of the latter. The developer composition can give high-quality visible images without causing reduction in density even after repeating duplication 50,000 times or more.

Examples of the positively chargeable charge controller include nigrosine dyes such as Nigrosine Base EX, Oil Black BS, Oli Black SO, Bontron N-01 and Bontron N-11 (the foregoing ones are made by Orient Chemical Co., Ltd.); triphenylmethane dyes having a tert. amine side chain; quaternary ammonium salts such as Bontron P-51 (made by Orient Chemical Co., Ltd.) and cetyltrimethylammonium bromide; polyamine resin such as AFP-B (made by Orient Chemical Co., Ltd.) and others.

Examples of the negatively chargeable charge controller include metal-containing azo dyes such as Varifast Black 3804, Bontron S-31, Bontron S-32, Bontron S-34 and Bontron S-36 (the foregoing ones are made by Orient Chemical Co., Ltd.) and Aizen Spilon Black TVH (made by Hodogaya Chemical Co., Ltd.); copper phthalocyanine dyes; metal complexes of alkyl salicylate such as Bontron E-82, Bontron E-84 and Bontron E-85 (the foregoing ones are made by Orient Chemical Co., Ltd.) and others.

The above charge controllers may be contained in the composition in an amount of 0.1 to 8.0% by weight, preferably 0.2 to 5.0% by weight, based on the binder resin.

The polyester resin to be used in the present invention can be prepared by carrying out the condensation polymerization between the carboxylic component and the alcoholic component, for example, in an inert gas atmosphere at a temperature of 180 to 250° C. In this preparation, an ordinary esterification catalyst such as zinc oxide, stannous oxide, dibutyltin oxide or dibutyltin dilaurate may be used to accelerate the condensation polymerization. Alternatively, the condensation polymerization may be carried out under a reduced pressure for the same purpose.

According to the present invention, a toner is produced by using the above polyester resin as a major component of a binder resin. The binder resin may further contain other resins such as a styrene resin or a styrene-acrylic resin having a number-average molecular weight of 11,000 or below in an amount not exceeding 30% by weight based on the binder resin to enhance the pulverizability. In the preparation of a toner, various additives, for example, offset inhibitors such as wax or fluidity improver such as hydrophobic silica are generally added in addition to a coloring agent and a magnetic material. When the polyester resin according to the present invention is used as a binder resin, however, said various additives need not be added, or even if they are added, the amount thereof may be small.

Examples of the coloring material to be used in the present invention include various carbon blacks produced by thermal black method, acetylene black method, channel black method or lamp black method, Phthalocyanine Blue, Permanent Brown FG, Brilliant Fast Scarlet, Pigment Green B, Rhodamine B base, Solvent Red 49 and 146, Solvent Blue 35 and mixtures thereof. The coloring material is used in an amount of 1 to 15 parts by weight per 100 parts by weight of the binder resin.

According to the present invention, the above polyester resin, at least two charge controllers, a coloring material and, if necessary, various additives are homogeneously dispersed, kneaded, cooled, pulverized and classified to obtain a toner having an average particle size of 5 to 15 μm. The obtained toner can be used as a dry developer of two-component system by mixing it with a powdery magnetic material such as an iron oxide carrier, spherical iron oxide carrier or ferrite carrier or a material obtained by coating any of these carriers with a resin.

When a magnetic toner is prepared by the use of the binder resin according to the present invention, about 40 to 70 parts by weight of a magnetic material in a state of a fine powder having an average particle size of 0.1 to 1 μ is dispersed in 100 parts by weight of the binder resin. Examples of the magnetic material include powders of ferromagnetic metals such as iron, cobalt and nickel and alloys and compounds containing a ferromagnetic element such as ferrite, hematite and magnetite.

DETAILED DESCRIPTION OF THE INVENTION

Preparative Examples of the binder resin and Examples of the present invention will be described, though the present invention is not limited by them.

In the Examples, all parts are by weight. Preparative Example 1

840 g of polyoxypropylene(2.2)-2,2-bis(4-hydroxyphenyl) propane, 195 g of polyoxyethylene(2)-2,2-bis(4-hydroxyphenyl) propane, 249 g of terephthalic acid, 132 g of fumaric acid, 29 g of 1,2,4-benzenetricarboxylic acid, 2 g of dibutyltin oxide and 1.5 g of hydroquinone were fed to a 2-l four-necked glass flask equipped with a thermometer, a stainless steel stirring rod, a reflux condenser and an inlet tube for nitrogen gas and heated up to 200° C. in a mantle heater in a nitrogen atmosphere under stirring to carry out the reaction. The degree of polymerization was traced by measuring a softening point according to ASTM 28-51T. The reaction was stopped when the softening point had reached 122° C. The obtained resin was a solid in pale yellow and was found to exhibit a glass transition temperature of 66° C. as determined by the use of a differential scanning calorimeter (DSC). The acid value of the resin was 14 KOH mg/g, while the hydroxyl value thereof was 28 KOHmg/g. Hereinafter, the resin is referred to as "binder resin (1)".

Preparative Example 2

1050 g of polyoxypropylene(2.2)-2,2-bis(4-hydroxyphenyl) propane, 339 g of azelaic acid and 141 g of 1,2,4-benzenetricarboxylic acid were condensed according to the same procedure as that described in Preparative Example 1 to obtain a polyester resin having a softening point of 122° C., a glass transition temperature of 60° C., an acid value of 19 KOH mg/g and a hydroxyl value of 31 KOH mg/g. Hereinafter, this resin is referred to as "binder resin (2)".

Preparative Example 3

The same procedure as that described in Preparative Example 1 was repeated except that the amount of terephthalic acid was 280 g to obtain a polyester resin having a softening point of 122° C., a glass transition temperature of 68° C., an acid value of 25 KOH mg/g and a hydroxyl value of 23 KOH mg/g. Hereinafter, this resin is referred to as "binder resin (3)".

Preparative Example 4

The same procedure as that described in Preparative Example 1 was repeated except that the reaction was stopped when the softening point reached 105° C. A polyester resin having a glass transition temperature of 64° C., an acid value of 20 KOH mg/g and a hydroxyl value of 35 KOH mg/g was obtained. Hereinafter, this resin is referred to as "binder resin (4)".

Examples 1 to 3 and Comparative Examples 1 to 5

The components of each of the following compositions were mixed in a ball mill and kneaded with a pressure kneader, cooled, pulverized and classified to obtain a toner having an average particle size of 11 μm.

Composition

Example 1

| | |
|---|---|
| binder resin (1) | 90 parts |
| carbon black "Regal 400R" (mfd. by Cabot Corporation) | 7 parts |
| negatively chargeable charge controller "Aizen Spilon Black TVH" (mfd. by Hodogaya Chemical Co., Ltd.) | 2 parts |
| positively chargeable charge controller "Bontron P-51" (mfd. by Orient Chemical Co., Ltd.) | 0.9 part |
| Example 2 | |
| binder resin (2) | 90 parts |
| carbon black "Regal 400R" | 7 parts |
| negatively chargeable charge controller "Bontron S-34" (mfd. by Orient Chemical Co., Ltd.) | 2 parts |
| positively chargeable charge controller "Bontron N-01" (mfd. by Orient Chemical Co., Ltd.) | 0.9 parts |
| Example 3 | |
| binder resin (1) | 90 parts |
| carbon black "Regal 400R" | 7 parts |
| negatively chargeable charge controller "Bontron E-84" (mfd. by Orient Chemical Co., Ltd.) | 2 parts |
| positively chargeable charge controller "Bontron N-11" (mfd. by Orient Chemical Co., Ltd.) | 0.9 part |
| Comparative Example 1 | |
| binder resin (1) | 90 parts |
| carbon black "Regal 400R" | 7 parts |
| Comparative Example 2 | |
| binder resin (1) | 90 parts |
| carbon black "Regal 400R" | 7 parts |
| negatively chargeable charge controller "Aizen Spilon Black TVH" | 2 parts |
| Comparative Example 3 | |
| binder resin (1) | 90 parts |
| carbon black "Regal 400R" | 7 parts |
| positively chargeable charge controller "Bontron P-51" | 0.9 part |
| Comparative Example 4 | |
| binder resin (3) | 90 parts |
| carbon black "Regal 400R" | 7 parts |
| negatively chargeable charge controller "Aizen Spilon Black TVH" | 2 parts |
| positively chargeable charge controller "Bontron P-51" | 0.9 part |
| Comparative Example 5 | |
| binder resin (4) | 90 parts |
| carbon black Regal 400R | 7 parts |
| negatively chargeable charge controller "Aizen Spilon Black TVH" | 2 parts |
| positively chargeable charge controller "Bontron p-51" | 0.9 part |

Hereinafter, the toners prepared in Examples 1 to 3 are referred to as "Toners 1 to 3" respectively, while those prepared in Comparative Examples 1 to 5 are referred to as "Comparative Toners 1 to 5" respectively.

39 g of each of these toners was mixed with 1261 g of a resin-coated iron powder to obtain a developer. An image was duplicated with this developer by the use of a commercially available electrophotographic duplicating machine which was equipped with a photosensitive body of amorphous selenium and a fixing roller which was set at a rotational speed of 255 mm/sec and the temperature of which was variable and was rid of an oil applicator.

The fixability of an image and offset properties were evaluated by varying the fixing temperature between 120 and 220° C. The results are shown in Table 1.

The lowest fixing temperature was determined as follows: the fixed image passed through a fixing device was rubbed by shutting with a typewriter eraser having a bottom surface are of 15 mm×7.5 mm on the image under a load of 500 g five times. The image was examined for optical reflection density with a Macbeth reflection densitomer both before and after the rubbing. The lowest fixing temperature means a temperature of the fixing roll at which the fixing ratio as defined by the following equation reaches 70 percent:

$$\text{Fixing ratio} = \frac{\text{image density after rubbing}}{\text{image density before rubbing}}$$

Comparative Toner 4 exhibited so poor fluidity that the transportability thereof in a developing device was also poor to give a copy having uneven image and stained non-image areas from the beginning of the duplication. Comparative Toner 5 exhibited a narrow non-offset temperature range, though exhibited a low lowest fixing temperature. In the duplication with Comparative Toners 1 and 2, the density of the image began to lower when the number of the continuously duplicated copies exceeded about 53,000 and was still low after the number exceeded 70,000. The duplication with Comparative Toner 3 gave a copy having stained non-image areas from the beginning of the duplication.

On the other hand, Toners 1 to 3 according to the present invention exhibited excellent fixability and transportability and gave high-quality visible images from the beginning of the duplication until the number of copies reached 120,000.

What is claimed is:

1. In a method for electrophotography wherein a latent electrostatic image is developed and fixed by a fixing roller, the improvement using a developer composition which comprises a polyester as the major component, said polyester obtained by co-condensation polymerization of components (i) a diol represented by the formula:

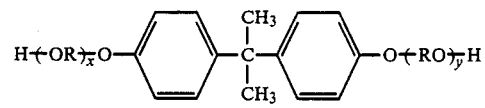

wherein R is an ethylene or propylene group and x and y are each an integer of 1 or more, with the proviso that the average sum total of x and y is 2 or 7, with (ii) a dicarboxylic acid, an anhydride or a lower alkyl ester thereof; and (iii) a polycarboxylic acid having at least three carboxyl groups, an anhydride or a lower alkyl ester thereof, or a polyhydric alcohol having at least three hydroxyl groups and having an OHV/AV value of at least 1.2 wherein AV is an acid value of said polyester and OHV is a hydroxyl value thereof, and at least two charge controllers, wherein at least one of which is positively chargeable and at least one of which is negatively chargeable.

2. The method according to claim 1 wherein said fixing roller process occurs at a temperature of less than 220° C.

3. The method according to claim 1, wherein said binder resin has a softening point of 106 to 160° C. and a glass transition temperature of 50 to 80° C.

4. The method according to claim 1, wherein the amount of said positively chargeable charge controller does not exceed one-half of that of said negatively chargeable charge controller.

5. The method according to claim 1 wherein component (iii) is present in an amount of from 5 to 60 molar % based on component (ii) or component (i).

6. The method according to claim 1 wherein said charge controllers are present in an amount of from 0.1 to 8.0% by weight of said binder resin.

7. The method according to claim 1 wherein said charge controllers are present in an amount of from 0.02 to 5.0% by weight of said binder resin.

8. The method according to claim 1 wherein the binder resin comprises up to 30% by weight based on the weight of the binder resin of a styrene resin or styrene-acrylic resin having a number-average molecular weight of 11,000 or less.

TABLE 1

| Toner | OHV/AV value of binder resin | Lowest fixing temp. (°C.) | Low-temp. offset disappearing temp. (°C.) | High-temp. offset initiating temp. (°C.) | Number of copies duplicated until the density of the image begins to lower |
|---|---|---|---|---|---|
| Toner 1 | 2.00 | 138 | 135 | 220< | 120,000< |
| Toner 2 | 1.63 | 136 | 135 | 220< | 120,000< |
| Toner 3 | 2.00 | 136 | 135 | 220< | 120,000< |
| Comp. Toner 1 | 2.00 | 135 | 135 | 220< | 53,000 |
| Comp. Toner 2 | 2.00 | 138 | 135 | 220< | 53,000 |
| Comp. Toner 3 | 2.00 | 138 | 135 | 220< | not worth evaluating because of significant staining in non-image areas |
| Comp. Toner 4 | 0.92 | 160 | 150 | 210 | not worth evaluating because of significant unevenness of image and significant staining of non-image areas |
| Comp. Toner 5 | 1.75 | 125 | 190 | 200 | not worth evaluating because of the occurrence of offset phenomenon |

* * * * *